US008467318B2

(12) United States Patent
Cherifi et al.

(10) Patent No.: US 8,467,318 B2
(45) Date of Patent: Jun. 18, 2013

(54) METHOD AND SYSTEM FOR TRANSFERRING IN-PROGRESS COMMUNICATION BETWEEN COMMUNICATION DEVICES (75) Inventors: Tanya D. Cherifi, Tampa, FL (US); David C. Robbins, Grafton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 677 days.

(21) Appl. No.: 12/624,731

(22) Filed: Nov. 24, 2009

(65) Prior Publication Data

US 2011/0122864 A1 May 26, 2011

(51) Int. Cl.
*H04L 12/16* (2006.01)
*H04L 12/66* (2006.01)
*H04Q 11/00* (2006.01)
*H04M 3/42* (2006.01)

(52) U.S. Cl.
USPC ............... 370/259; 370/352; 379/212.01

(58) Field of Classification Search
None
See application file for complete search history.

(56) References Cited

U.S. PATENT DOCUMENTS

| 7,042,879 | B2* | 5/2006 | Eschbach et al. | 370/392 |
| 7,106,848 | B1* | 9/2006 | Barlow et al. | 379/212.01 |
| 7,443,972 | B1* | 10/2008 | Barlow et al. | 379/212.01 |
| 8,144,857 | B1* | 3/2012 | Barlow et al. | 379/212.01 |
| 2008/0056475 | A1* | 3/2008 | Brannick et al. | 379/201.01 |
| 2008/0205618 | A1* | 8/2008 | Crockett et al. | 379/212.01 |
| 2009/0136016 | A1* | 5/2009 | Gornoi et al. | 379/212.01 |
| 2009/0268895 | A1* | 10/2009 | Emerson | 379/212.01 |
| 2009/0274283 | A1* | 11/2009 | Jain et al. | 379/142.01 |
| 2010/0215036 | A1* | 8/2010 | Eom et al. | 370/352 |

* cited by examiner

Primary Examiner — Chirag Shah
Assistant Examiner — Suk Jin Kang (57) ABSTRACT An approach is provided for transferring in-progress communication between communication devices. A transfer code is received from a target terminal of a user. An in-progress call is detected between a first terminal and a second terminal, where the first terminal is associated with the user, and the second terminal is associated with another user. Transfer of the in-progress call from the first terminal to the target terminal is initiated in response to the received transfer code.

19 Claims, 10 Drawing Sheets

METHOD AND SYSTEM FOR TRANSFERRING IN-PROGRESS COMMUNICATION BETWEEN COMMUNICATION DEVICES

BACKGROUND INFORMATION

With the advancement and prevalence of communication services, consumers have a variety of options with respect to these services and communication devices, such as landline telephones, cellular telephones, laptop computers, or personal digital assistants (PDAs). Notably, these devices can support, among other functions, voice communication sessions via different services with differing cost structures. However, users have traditionally been provided little control over the management of their communication sessions. In other words, users are not able to optimize how they communicate using the many available devices to take advantage of potential cost savings. For example, if a user is engaged in a cellular phone call during peak operating hours and arrives at home where a more cost-effective option exists, i.e., a landline station, the user can utilize the landline station to communicate. Unfortunately, this requires terminating the current session and reestablishing a new session. Such option is impractical, particularly if the user is reluctant to interrupt the phone call, as in the case of a business call, for instance. Moreover, most users would not consider the inconvenience of having to hang up and dial the other party worth the cost savings.

Another consideration relating to how communication services are utilized and developed is the fact that service providers are continually challenged to develop services to meet consumer demands for features that provide greater convenience, while seeking new sources of revenue.

Therefore, there is a need for an approach to enable greater user control of call sessions among communication devices.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred method and system for transferring in-progress communication between communication devices are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to circuit-switched systems for providing voice communication sessions, it is contemplated that the in-progress transfer approach can be utilized with packetized voice systems (e.g., voice over Internet Protocol (VoIP) systems).

Figure 1A:
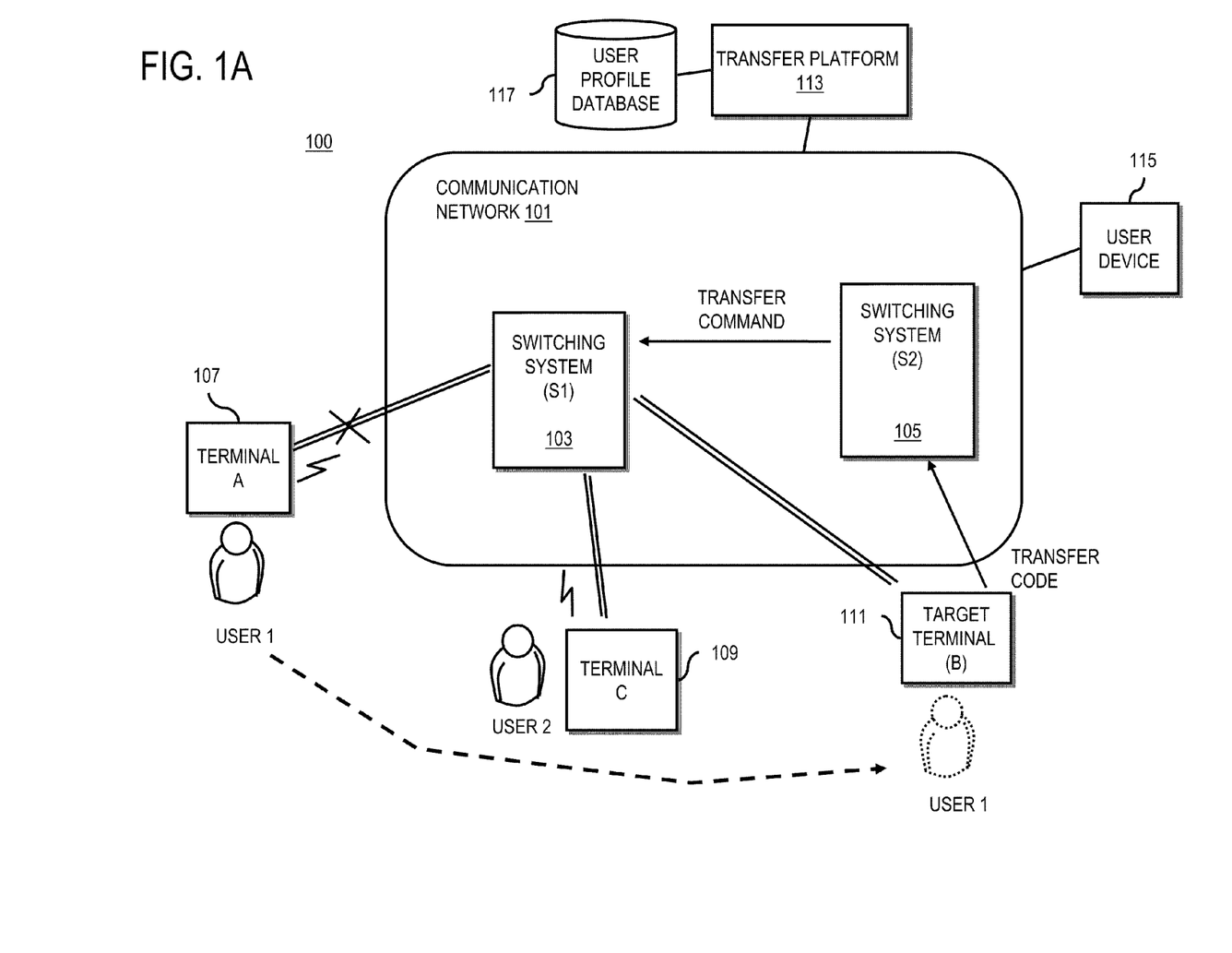
FIGS. 1A and 1B are diagrams of a communication system capable of transferring in-progress communication between communication devices, according to an exemplary embodiment.
Figure 2:
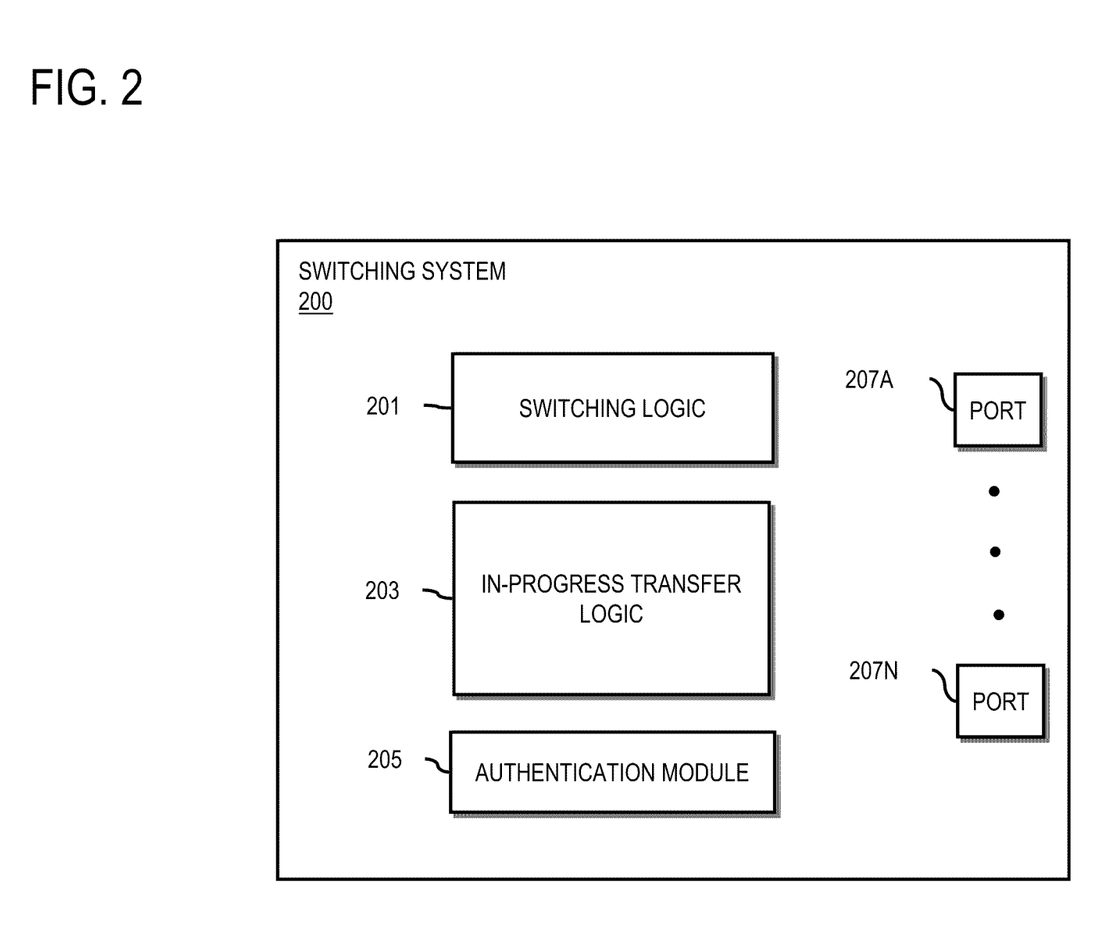
FIG. 2 is a diagram of components of a switching system in the system of FIGS. 1A and 1B, according to an exemplary embodiment.

FIG. 1A is a diagram of a communication system capable of transferring in-progress communication between communication devices, according to an exemplary embodiment. For the purposes of illustration, system 100 includes a communication network 101 utilizing multiple switching systems (S1, S2) 103, 105 for serving terminals (A-C) 107, 109, and 111. A transfer platform 113, among other functions, provides a capability for a subscriber terminal (e.g., terminal B) to initiate transfer of an in-progress voice call from, e.g., terminal A, to terminal B. That is, the transfer is initiated by a device not involved with the voice call, and thereby terminating a call leg associated with one of the devices originally engaged in the communication. In this example, it is noted that control of terminals A and B are under the control of User 1, whereby User 1 may transfer communication between this terminals, either from terminal A to terminal B, or vice versa. By contrast, traditional transfer capability involves transferring a call from a called terminal to another terminal. In effect, the transfer platform 113 can provide the in-progress transfer capability as a managed service by a service provider. The service provider may implement this in-progress transfer capability as a switch feature (as depicted in FIG. 2). According to certain embodiments, terminal B, as the target terminal, utilizes a transfer code (or access code) to signal the network 101 that a transfer is requested; the transfer code can be any sequence of alphanumeric characters. As such, subscribers to this service can specify one or more transfer codes corresponding, respectively, with one or more devices (or terminals) that can initiate the transfer. Although shown as a standalone system, the transfer platform 113 can be integrated with the switching system and/or signaling network (not shown).

By way of example, a subscriber may employ a user device 115 (e.g., computer, mobile phone, etc.) to interface the transfer platform 113 to specify these transfer codes and associated devices. Such codes can be stored as part of a user profile within database 117. The user profile may also include account information for the subscriber. It is noted that, a user can create, update, or delete transfer permission data through a variety of possible means. Permission data specifies verification information, such as the predetermined transfer code, the authorized terminals, user authentication data, etc. In exemplary embodiment of FIG. 1A, transfer platform 113 and user profile database 117 can be used to create, update, or delete permission data. In one embodiment, transfer platform 113, which can operatively be connected to communication network 101, can support at least one of a telephony interface and a web interface. Transfer platform 113 can store user (e.g., subscribers of a service provide) profiles in user profile database 117. In one example, a user can utilize a user device 115 to initiate a communication with transfer platform 113 to create, update, or delete the user profile. User profile stored in user profile database 117 can include transfer codes, permission data, information regarding one or more terminals permitted to transfer calls, authentication data, etc.

Under the scenario of FIG. 1A, terminals A and C are wireless devices (e.g., cellular phones, personal digital assistants (PDAs) with telephony functionality, laptop with VoIP client, etc.), while terminal C is a wired device (e.g., landline voice station, desktop computer with VoIP client). Terminal A and C are served by switching system (S1) 103, and terminal B by switching system (S2) 107. Although only two switching systems 103 and 105 are shown, it is contemplated that the communication network 101 can include any number and combination of switching systems along with other network elements to implement circuit-switched telephony sessions and/or packet-switched telephony sessions.

Figure 1B:
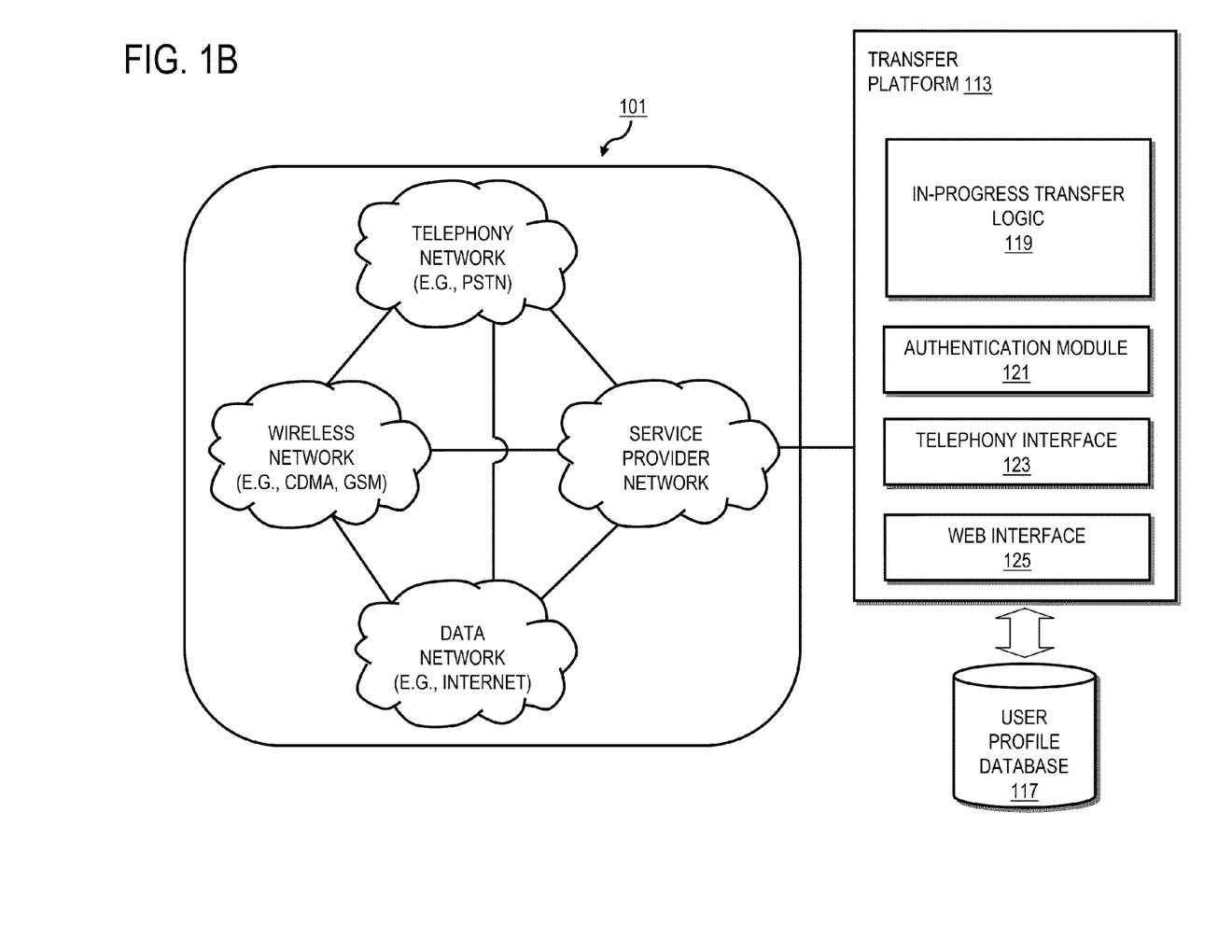

As seen in FIG. 1B, communication network 101 may include one or more networks such as a data network, a telephony network, a wireless network, and a service provider network. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. Moreover, the telephony network can be provided via a combination of circuit-switched technologies or a packetized voice infrastructure. For example, communication network 101 can include a public switched telephone network (PSTN), a Voice over Internet Protocol (VoIP) network, or a combination thereof. The PSTN is network of the world's public circuit-switched telephone networks that presently, in most cases, carries ensuing cross-country conversation. The PSTN can use Time Division Multiplexing (TDM) based network. However, service providers are currently confronting the possibility of a transition from current TDM based network to VoIP network such as Internet and packet-switched networks.

Moreover, communication network 101 can include a wireless (radio) network that supports a number of wireless terminals, which may be fixed or mobile, using various radio access technologies. According to one embodiment, radio technologies that can be contemplated include: first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), 4G, etc. For instance, various mobile communication standards have been introduced, such as first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), and beyond 3G technologies (e.g., third generation partnership project (3GPP) long term evolution (3GPP LTE), 3GPP2 universal mobile broadband (3GPP2 UMB), etc.).

Also, other access technologies have been developed by various professional bodies, such as the Institute of Electrical and Electronic Engineers (IEEE), for the support of various applications, services, and deployment scenarios. For example, the IEEE 802.11 standard, also known as wireless fidelity (WiFi), has been introduced for wireless local area networking, while the IEEE 802.16 standard, also known as worldwide interoperability for microwave access (WiMAX), has been introduced for the provision of wireless communications on point-to-point links, as well as for full mobile access over longer distances. Other examples include Bluetooth, ultra-wideband (UWB), the IEEE 802.22 standard, etc.

Regarding the transmission of voice calls over the data network (e.g., IP network), four possible general scenarios exist with the placement of a VoIP call: (1) phone-to-phone, (2) phone-to-PC, (3) PC-to-phone, and (4) PC-to-PC. In the first scenario of phone-to-phone call establishment, a voice station is switched through PSTN by a switch to a VoIP gateway (not shown), which forwards the call through the IP network. The packetized voice call is then routed through the IP network, exiting the IP network at an appropriate point to enter the PSTN and terminates at a voice station. Under the second scenario, a voice station places a call to PC (not shown) through a switch to the PSTN. This voice call is then switched by the PSTN to a VoIP gateway (not shown), which forwards the voice call to a PC via the IP network. The third scenario involves a PC that places a call to a voice station. Using a voice encoder, the PC introduces a stream of voice packets (into the IP network) that are destined for a VoIP gateway (not shown). The VoIP gateway (not shown) converts the packetized voice information into a POTS (Plain Old Telephone Service) electrical signal, which is circuit switched to the voice station. Lastly, in the fourth scenario, a PC establishes a voice call with a PC; in this case, packetized voice data is transmitted from the PC via the IP network to another PC, where the packetized voice data is decoded.

In support of VoIP calls, the network 101, according to certain embodiments, employs SIP to exchange messages. A detailed discussion of SIP and its call control services are described in IETF RFC 2543 and IETF Internet draft "SIP Call Control Services", Jun. 17, 1999; both of these documents are incorporated herein by reference in their entireties. SIP messages are either requests or responses. SIP defines six types of requests, which are also referred to as methods. The first method is the INVITE method, which invites a user to a conference. The next method is the ACK method, which provides for reliable message exchanges for invitations in that the client is sent a confirmation to the INVITE request. That is, a successful SIP invitation includes an INVITE request followed by an ACK request. Another method is the BYE request, which indicates to a user agent server (UAS) that the call should be released. In other words, BYE terminates a connection between two users or parties in a conference. The next method is the OPTIONS method; this method solicits information about capabilities and does not assist with establishment of a call. Lastly, the REGISTER provides information about a user's location to a SIP server. Since SIP can be used for signaling, a media session can be transported using schemes such as RTP (Reliable Transport Protocol)/UDP (User Datagram Protocol), RTP/TCP (Transmission Control Protocol), RTP/SCTP (Stream Control Transmission Protocol), and AAL (ATM Adaptation Layer)/ATM (Asynchronous Transfer Mode) among many others; this service allows calling between schemes in an efficient way.

Although depicted as separate entities, the networks with communication network 101 may be completely or partially contained within one another, or may embody one or more of the aforementioned infrastructures. For instance, service provider network may embody circuit-switched and/or packet-switched networks that include facilities to provide for transport of circuit-switched and/or packet-based communications. It is further contemplated that networks may include components and facilities to provide for signaling and/or bearer communications between the various components or facilities of system 100. In this manner, the networks of communication network 101 may embody or include portions of a signaling system 7 (SS7) network, or other suitable infrastructure to support control and signaling functions. As such, the conjunction of these networks may be adapted to facilitate the in-progress transfer feature.

Transfer platform 113 (as illustrated in FIG. 1B), according to one embodiment, includes an in-progress transfer logic 119, and optionally an authentication module 121, telephony interface 123, and a web interface 125 to enable user management of a voice call. The telephony interface 123 may include an interactive voice response (IVR) function for permitting a user to receive automated prompts and provide input. Alternatively, the IVR functionality can be provided by a separate IVR unit. The web interface 125 permits a user to communicate with the platform 113 via a web portal. In one scenario, User 1 is engaged in a voice communication session via terminal A, e.g., cellular phone, with User 2, who utilizes terminal C. This voice communication session may have been initiated by either User 1 or User 2. Communication path between terminals A and C can include communication segment A-S1 (between terminal A and switching system S1) and communication segment C-S1 (between terminal (C) 109 and switching system (S1) 103).

Assuming User 1 moves to a location in which another device, terminal B, is available for use by User 1, User 1 has the option of continuing the voice communication session over the wireless (e.g., cellular) network within communication network 101, or terminal B, which is a landline station—e.g., any suitable computing device, such as a VoIP phone, skinny client control protocol (SCCP) phone, session initiation protocol (SIP) phone, IP phone, personal computer, softphone, workstation, etc. The capability for User 1 to select which device to use is enabled by the in-progress transfer feature supported by switching system S1 or S2 in conjunction with the transfer platform 113. Here, it is assumed that terminal B is served by switching system S2. Once within proximity of terminal B, User 1 may decide to continue the communication with User 2 with terminal B for a variety of reasons; e.g., terminal A may have a low battery condition, or the cost of the communication service associated with terminal B is less than that of the terminal A. To effect this in-progress transfer, User 1 may simply enter a pre-determined transfer code from terminal B, which is denoted the "target" terminal as it is the target of the transfer. Such activity can be transparent to User 2—i.e., User 1 need not inform User 2 that a transfer is impending. The transfer code is provided to switching system S2, which is configured to interpret the received transfer code as a request for transferring an in-progress communication, and to seek verification from the transfer platform 113. According to one embodiment, upon detecting the transfer code, switching system S2 may consult with the transfer platform 113, whereby the in-progress transfer logic 119 can instruct the switching system accordingly.

Thereafter, switching system S2 (or S1 if control is passed to switching system S1 by switching system S2) can determine whether terminal B is a valid transfer terminal. In an exemplary embodiment, switching system S2 determines whether terminal B is a valid transfer terminal based solely on the transfer code. Alternatively, the determination can be made based on other information about the user via the authentication module 121.

The transfer platform 113 may then retrieve the appropriate user profile from the database 117 using the directory identifier (or other network addressing information) of terminal B to determine whether target terminal B is authorized to conduct the transfer. In one embodiment, switching system S1 can retrieve permission data associated with the transfer code from transfer platform 113. Based on the retrieved permission data, switching system (S1) can determine the terminals that are permitted to transfer communication. The validity of the transfer code or transfer-requesting terminal can be determined based on the permission data, according to certain embodiments. Additionally or alternatively, to provide additional protection against unintended transfers, transfer platform 113 may require an authentication process, as executed by authentication module 121, to permit terminal B to initiate the in-progress transfer. For instance, passwords can be defined for terminals that are given permission to transfer communication. User 1 may be prompted, by the IVR module, to provide a password (such prompt can be provided by a processor within the signaling network, for example). Transfer of the in-progress communication can only occur if correct password is provided. However, it is contemplated other approaches may be utilized, depending on the security requirements and other factors, such as convenience for the subscriber. The in-progress transfer feature can be blocked if validation of terminal B fails. In which case, the User 1 can be notified accordingly via terminal B.

Upon receiving the authentication confirmation (e.g., permission acknowledgement or grant message), switching system S2 may send a transfer command to switching system S1 to establish a new segment S1-B with target terminal B, and then terminate the call leg, A-S1, with terminal A. It is noted that the communication with terminal B can involve one or more other segments—e.g., S1-S2 and S2-B. After the transfer, User 1 can continue to communicate with User 2 using the target terminal B.

Although the above scenario involves User 1 controlling terminals A and B, it is contemplated that a different user, User 3, may have control of terminal B, and thus, has the ability to control the communication session. Such scenario, for example, can be found in a business setting whereby an employee (e.g., salesperson) enters the room and gestures to a supervisor to handle the call.

Furthermore, the transfer can occur from terminal B to terminal A when User 1 has to be mobile. Under this scenario, the transfer code would be entered from terminal A. Hence, User 1 can leave the premises and travel to another destination.

Switching systems 103 and 105, depending on the implementation, can be deployed within a wireline network and a wireless network, and can accommodate various telephony technologies—VoIP functionalities, or just plain-old-telephone service (POTS). Switching systems 103 and 105 can communicate with one another for the purpose of switching (or routing) voice communication sessions among terminals 107-111. Each of the switching systems 103 and 105 can have a distributed switching system architecture or a centralized switching architecture.

The approach arrangement is described with respect to transfer platform 113 as a separate component. In one embodiment, the functions of transfer platform 113 can be implemented within a switching system (e.g. system S1 or system S2), as next described.

FIG. 2 is a block diagram of components of a switching system, according to an exemplary embodiment. Switching system 200, which can be any one of switching system 103 or system 105, includes, includes a switching logic or fabric 201, an in-progress transfer logic 203, an authentication module 205, and ports 207a-207n.

By way of example, switching logic 201 can be configured to establish, maintain, and terminate connections between communication devices. In one embodiment, switching logic 201 can also be used for non-switching functions, such as, for example, task scheduling and processor interrupt handling. Ports 207a-207n can be used for connection between communication devices and/or other switching systems in the communication system 100.

In-progress transfer logic 203 is configured to transfer an in-progress communication of a first terminal (e.g., terminal A) and a second terminal (e.g., terminal C) from the first terminal to a target terminal (e.g., terminal B). According to one embodiment, in-progress transfer logic 203 is configured to receive a transfer code from the target terminal of a user, detect the received transfer code as a request to transfer the in-progress communication, detect the in-progress communication, and execute the transfer of the in-progress communication from the first terminal to the target terminal.

Additionally, in-progress transfer logic 203 can be configured to determine whether the received transfer code is a valid transfer code. In one embodiment, in-progress transfer logic 203 retrieve permission data associated with the transfer code, determine one or more permitted transfer terminals, and determine the validity of the transfer code based on the permission data. Additionally or alternatively, in-progress transfer logic 203 can send a validation request to authentication module 205 to determine the validity of the received transfer code. In one embodiment, authentication module 205 can perform additional steps to authenticate the user of the target terminal.

In an embodiment, transfer code can be a short "feature code"—e.g., in the form of "*XX" where X can represent any of the ten digits. In another example, the transfer code can be a standard ten-digit telephone number that may further require a code to be dialed to identify the device from which communication is to be transferred.

If the validity of the transfer code, the target terminal, the user, etc. is determined, in-progress transfer logic 203 initiates the transfer of the in-progress communication. In one embodiment, in-progress transfer logic 203, directly, through switching logic 201, or any combination thereof, can establish a communication segment with the target terminal, disconnect a communication segment of the source terminal (i.e., terminal in which the call is to be transferred from), connect or bridge the communication segment of the target terminal to the communication segment of the terminal involved in the communication session, and release the communication segment of the source terminal.

Figure 3A:
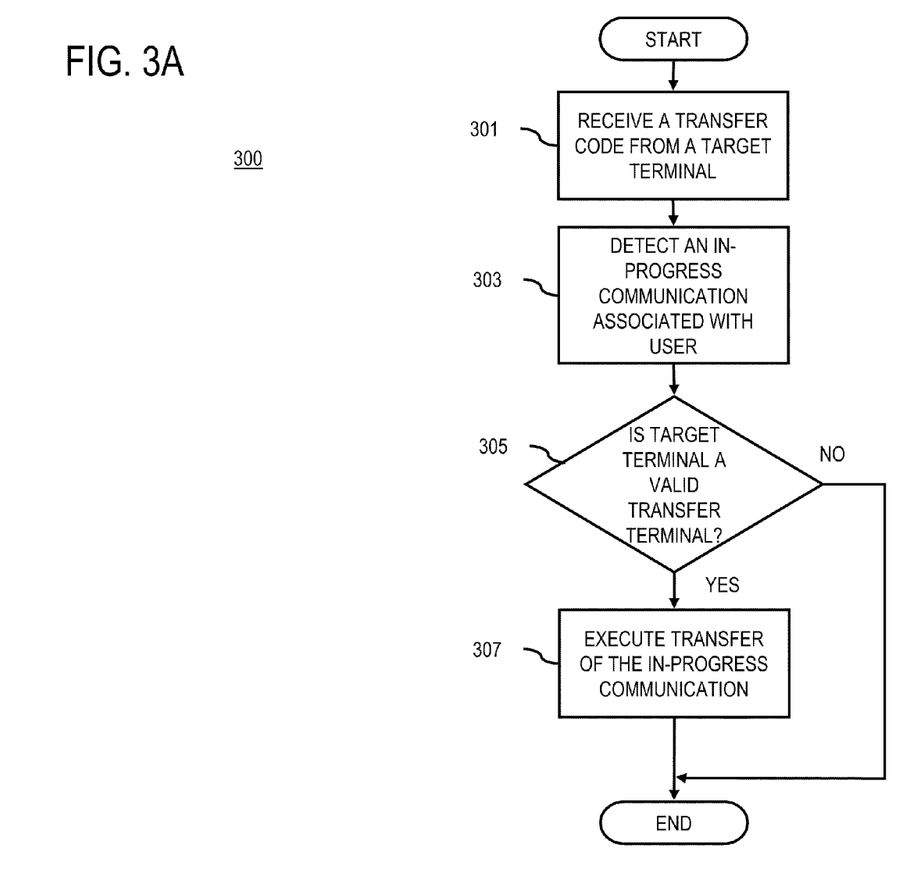
FIGS. 3A-3C are flowcharts of processes for transferring in-progress communication between communication devices, according to various exemplary embodiments.
Figure 3B:
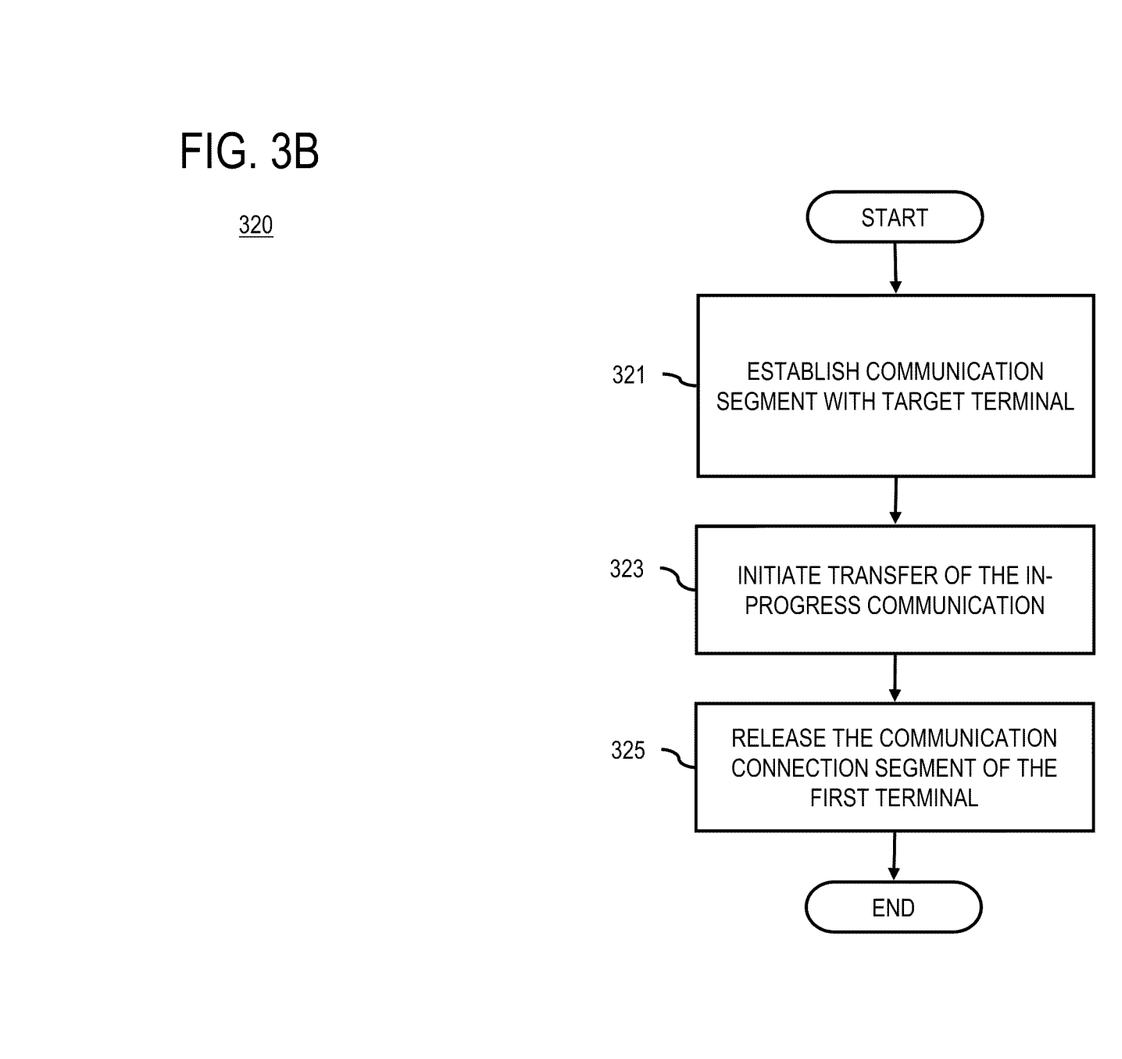
Figure 3C:
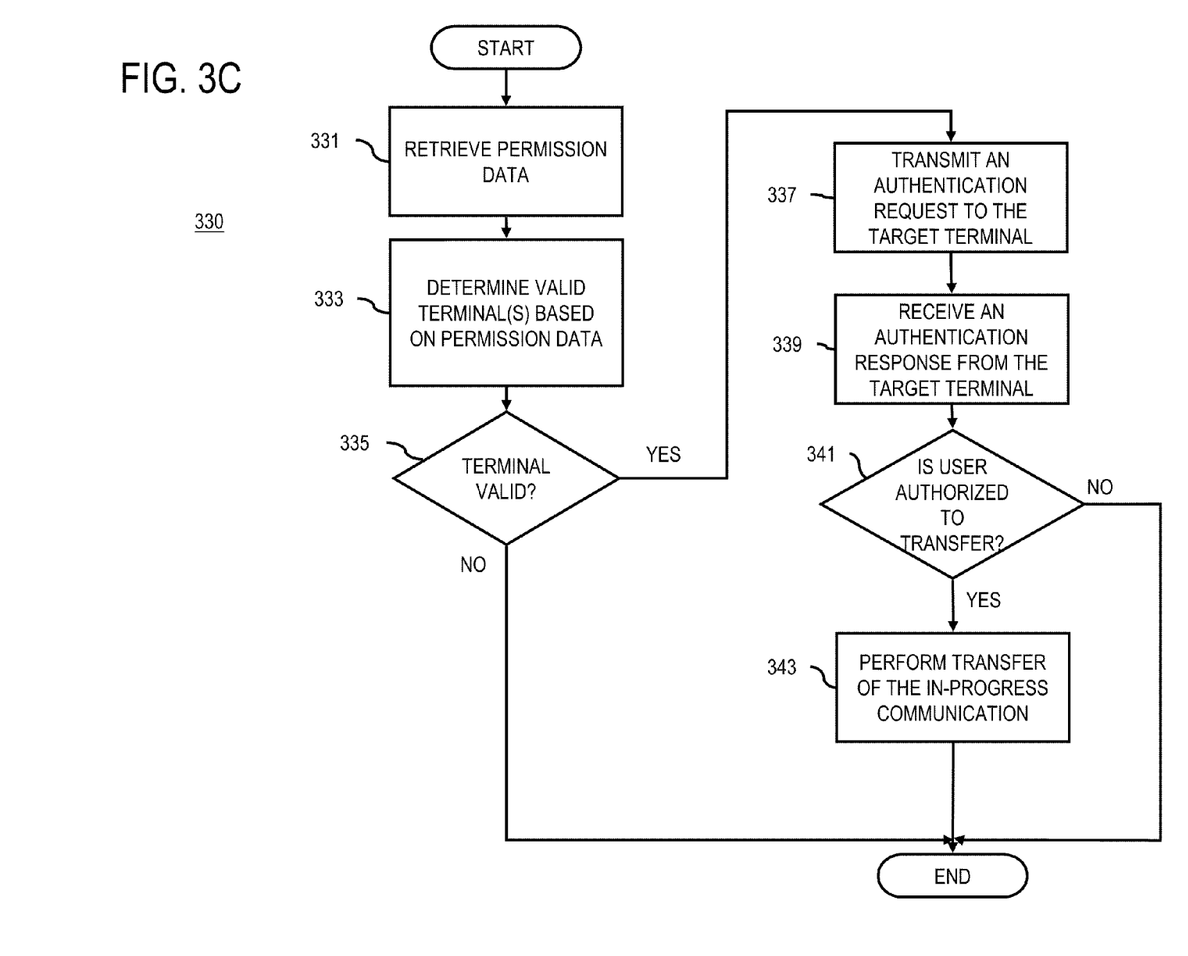

FIGS. 3A-3C are flowcharts of processes for transferring in-progress communication between communication devices, according to various exemplary embodiments. For the purposes of illustration, process 300 is described with respect to system 100 of FIG. 1A. At step 301, a transfer code is received from a target terminal, e.g., terminal B. Such code can be received by switching system S2, which serves terminal B. Alternatively or additionally, the transfer code from another switching system. The target terminal can be associated to a user (e.g., a subscriber) that seeks to transfer an in-progress communication for a source device (e.g., terminal A) to the target terminal, terminal B. In coordination with switching system S2, the switching system S1 detects an in-progress communication associated with the user, per step 303. That is, the switching system S1 determines the in-progress communication based on the user profile, according to one embodiment. For example, the user profile can specify all the directory numbers (or other identifiers) for the subscriber, and thus, can seek out the particular communication session corresponding to one of the identifiers. Various mechanisms can be employed to ensure that the communication session can be properly detected; e.g., a unique one-to-one mapping between transfer code and terminal. Accordingly, the detection of the in-progress call is based on the received transfer code.

At step 305, the switching system S1 determines whether the target terminal is a valid transfer terminal. This verification procedure is more fully described in FIG. 3C. If the switching system S1 determines that the target terminal is not a valid transfer terminal, process 300 terminates. At this point, the user can be notified of the failed transfer attempt by the target terminal, for example, by an IVR unit.

However, if the switching system S1 determines that the target terminal is a valid transfer terminal, the transfer of the in-progress communication is executed. This step 307 is more fully described with respect to FIG. 3B.

At step 321, a new communication segment (or call leg) is established with the target terminal. Next, the in-progress communication transfer is initiated, so that the communication session is now being handled by the target terminal (step 323). The communication segment supporting the source terminal is disconnected, per step 325.

FIG. 3C illustrates another exemplary process that can be performed at a switching system to determine validity of a transfer code and to authenticate the user for transferring the in-progress communication. After receiving the transfer code, process 330 provides for use of permission data to ensure that the transfer is intended. That is, permission data associated with the transfer code of the target terminal can be acquired, as in step 331. In one embodiment, the permission data can be retrieved from user profile database 117. The permission data can indicate one or more terminals that are authorized to initiate the transfer. Thus, information about the valid terminal(s) can be extracted from the permission data, as in step 333.

Hence, at step 335, process 330 determines whether the terminal is authorized.

If the transfer code is not a valid transfer code, process 340 terminates. In one embodiment, to provide additional protection against unintended transfers or increased security, at step 337, an authentication request can be transmitted to the target terminal for the user to input credential information, e.g., password (which can be specified as part of the user profile). Next, the user receives a prompt to enter the password as part of an authentication response from the target terminal (step 339). At step 341a determination is made whether the user of the target terminal is an authorized user to initiate the transfer of the in-progress communication based on the password. If the user is authorized, at step 343, the transfer process can be performed.

Figure 4A:
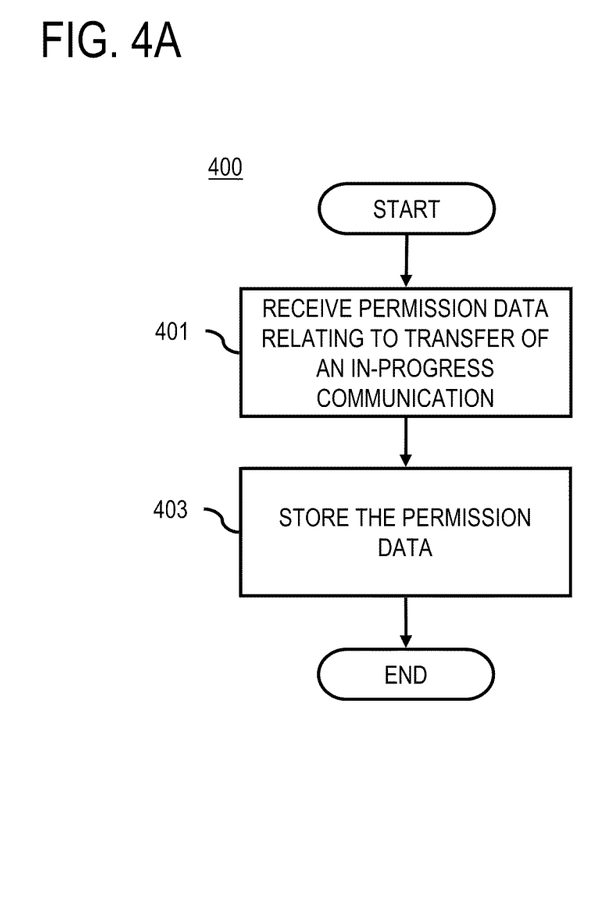
FIGS. 4A and 4B are flowcharts of processes for accessing permission data, according to various exemplary embodiments.
Figure 4B:
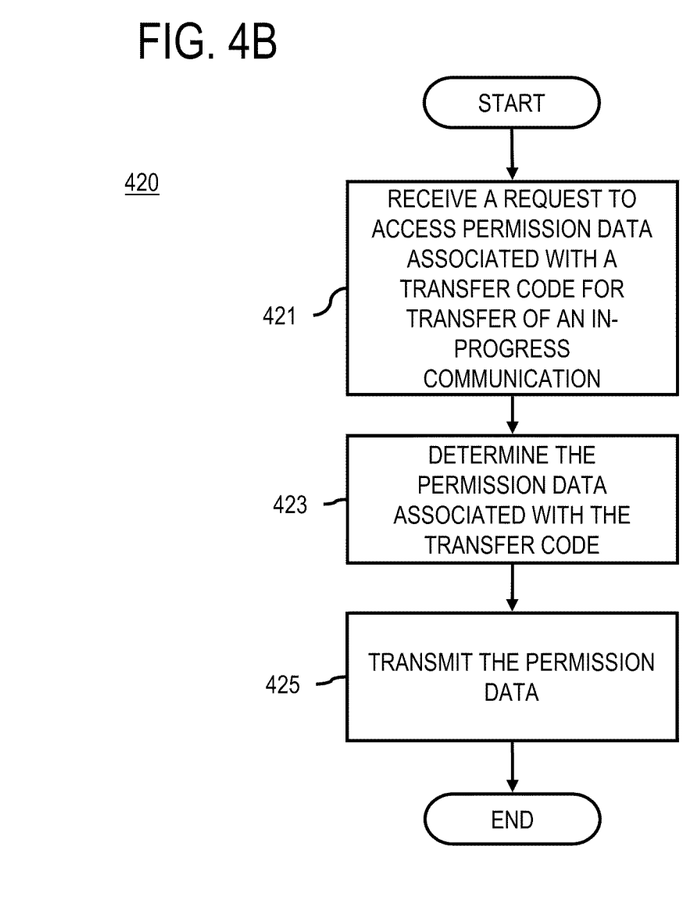

FIGS. 4A and 4B illustrate processes that can be performed at transfer platform 113 of communication system 100 of FIG. 1A, for accessing permission data, according to various exemplary embodiment. In one embodiment, in step 401, a subscriber may specify permission data as part of the set-up of the user profile using for example the user device 115. Consequently, transfer platform 113 receives the permission data and stores the information within the user profile database 117, per step 403.

In certain embodiments, transfer platform 113 provides a telephony interface and/or a web portal for the user to input the permission data. As discussed, the permission data can include information regarding a transfer code, one or more terminals permitted to transfer in-progress communications, user authentication data, etc. The permission data can be forwarded to one or more switching systems and can be used in validation processes of transfer codes, terminals, users, etc.

FIG. 4B illustrates an exemplary embodiment for forwarding permission data to one or more switching systems and can be performed at transfer platform 113. For purposes of explanation, process 420 is described with respect to transfer platform 113 of FIG. 1A. At step 421, transfer platform 113 receives a request to access the permission data, from example, from a switching system (e.g., system S1 or system S2). The access request can include information regarding a transfer code. At step 423, transfer platform 113 can determine the requested permission data associated with the transfer code. Transfer platform 113 can retrieve the requested permission data from user profile database 117. At step 425, the requested permission data is transmitted to the requester (such as a switching system) that is used for the described validation processes.

Figure 5:
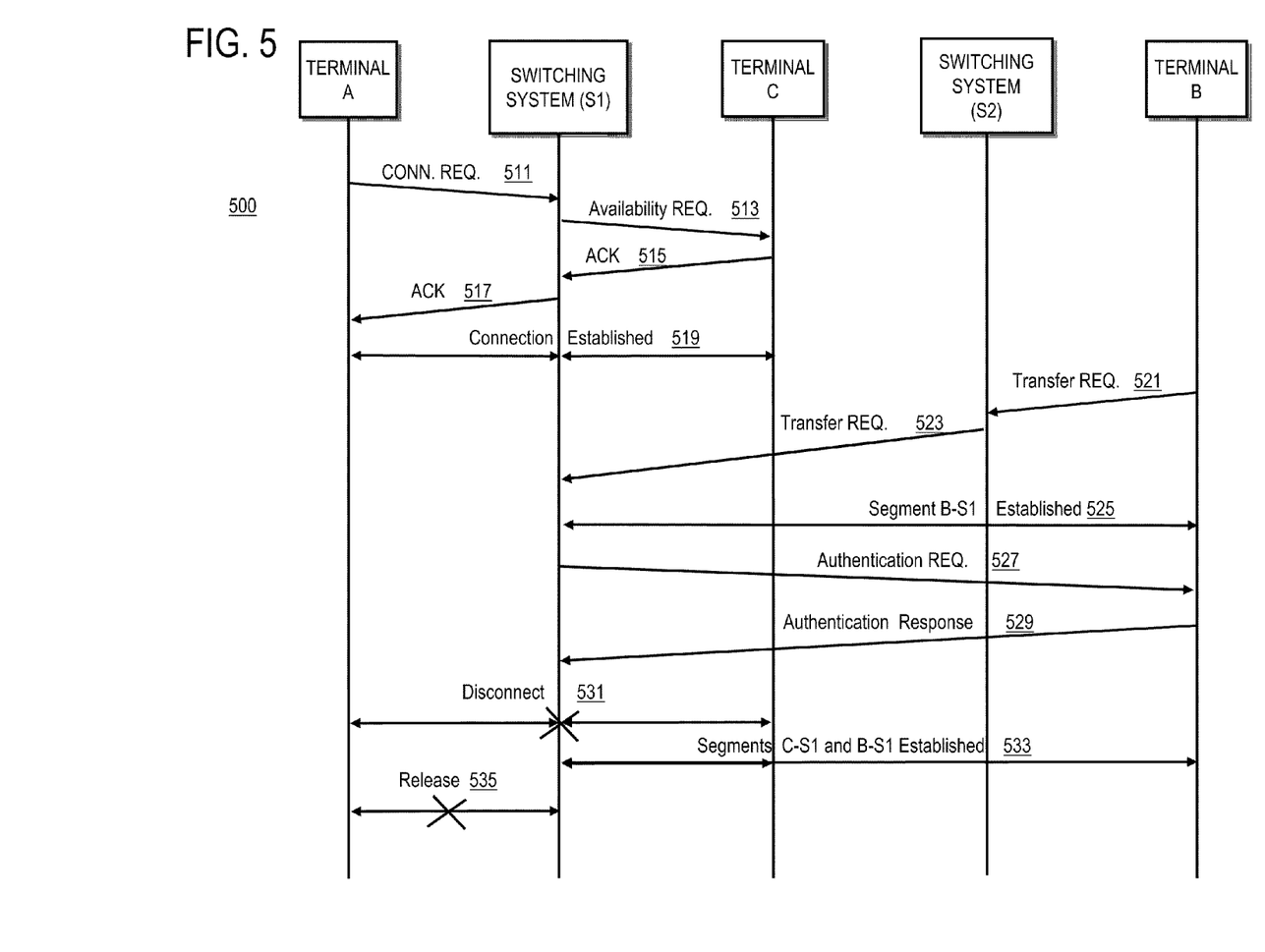
FIG. 5 is a ladder diagram of a process for transferring in-progress communication, according to an exemplary embodiment.

FIG. 5 is a ladder diagram of transferring in-progress communication between communication devices, according to an exemplary embodiment. This process 500 is explained with respect to the system 100 of FIG. 1. In this example, terminal A establishes a communication session (e.g., voice call) with terminal C by first signaling a communication connection request S11 to switching system S1, per step 511. In turn, switching system S1 transmits an availability request, as in step 513, to terminal C to determine whether terminal C is available to accept the call. If terminal C is not busy (or otherwise unavailable), terminal C sends an acknowledgment (ACK) to switching system S1 that it is available to accept the call, as in step 515. Subsequently, switching system S1 responds to terminal A's request with an acknowledgment that terminal C is available for communication (step 517); such acknowledgement can be in form of a ringback tone. At this point, in step 519, the voice call establishment procedure is completed, and the users of terminal A and C can begin conversing. This communication session involves two segments: A-S1 (between terminal A and switching system S1) and C-S1 (between terminal C and switching system S1).

While the voice call is in progress between terminals A and C, user of terminal A (e.g., User 1 of FIG. 1A) initiates a transfer of the in-progress communication to another terminal, for example, terminal B. In one example, both terminals A and B can be used by the same user. As mentioned previously, in order to initiate the transfer, terminal B can transmit a transfer request, per step 521, to switching system S2. This transfer request can include a pre-determined transfer code. Switching system S2 determines that communication received from terminal B is a transfer request and that the request should be routed to switching system S1. In step 523, switching system S2 routes the transfer request S23 to switching system S1.

In step 525, switching system S1 establishes a segment to terminal B. In this example, switching system S1 sends an authentication request to terminal B (step 527), which transmits an authentication response, per step 529, to switching system S1. Switching system S1 then determines whether terminal B is a valid transfer terminal. This determination can be based on either the transfer code sent by terminal B, the authentication result, permissions defined for terminals A and B, or any combination thereof.

If it is determined that terminal B is a valid transfer terminal, switching system S1, per step 531, can disconnect (or release) segments A-S1 and C-S1 from each other, and can connect segments B-S1 and C-S1. Therefore, the in-progress communication between terminals A and C can be transferred to terminal B (from terminal A). In order to complete the transfer, switching system S1 releases communication connection A-S1, as in step 535.

As explained, the in-progress transfer logic can be implemented in either switching systems S1 and S2 as well as a separate processing system—i.e., transfer platform 113. The scenario of FIGS. 6A-6C, the transfer code is forwarded to system S1 for processing.

Figure 6A:
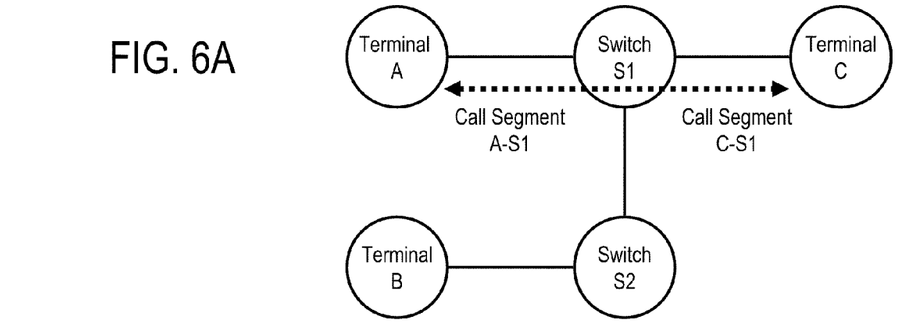
FIGS. 6A-6C are diagrams of a process for transferring in-progress communication, according to an exemplary embodiment.
Figure 6B:
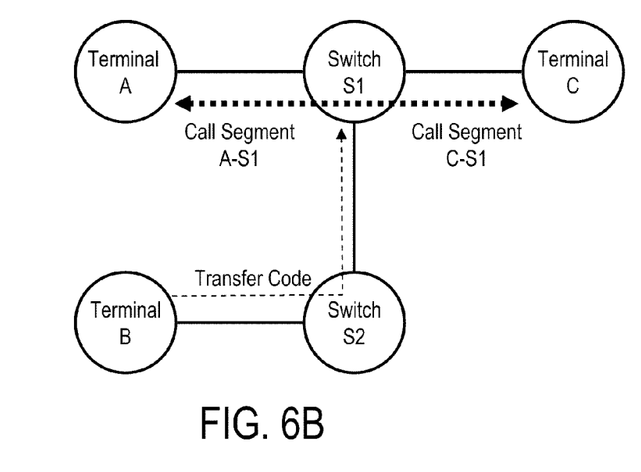
Figure 6C:
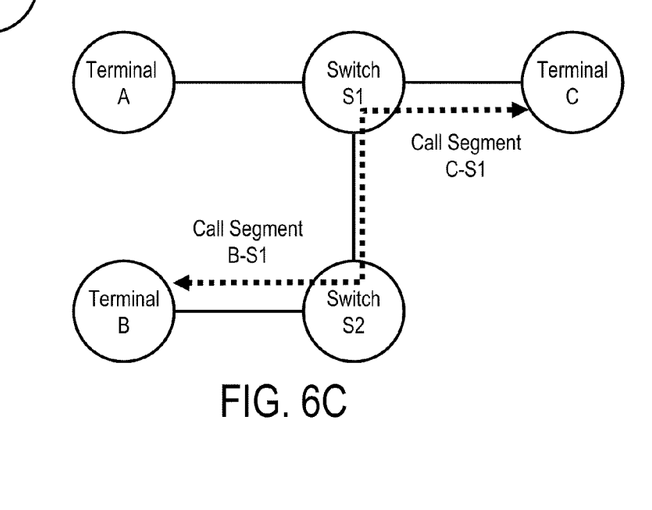

FIGS. 6A-6C are diagrams of a process for transferring the in-progress communication, according to an exemplary embodiment. The embodiments of FIG. 6A-6C illustrate the scenario of FIG. 3, but better illustrates the interaction between switching systems S1 and S2 in processing the transfer code from terminal B. FIG. 6A depicts an initial condition whereby the active communication session is in progress between the terminal A, as established through switching system S1. This active communication between the terminals A and C includes communication segments (such as call segments) A-S1 and C-S1.

In FIG. 6B, the transfer code is conveyed to switching system S2, which then relays this information to switching system S1 for processing. In one embodiment, the user of terminal B dials the transfer code, which is interpreted by switching system S2 to route the call to switching system S1, thereby creating communication segment B-S1. Alternatively, the processing can be performed strictly by switching system S2 in conjunction with transfer platform 113; the result can be that S2 sends a transfer request (without the actual transfer code) to switching system S1. Switching system S1 recognizes the call as a request to transfer to the terminal B the in-progress communication (such as an active call) on the terminal A. After validating that terminal B has permission to transfer an in-progress communication from the terminal A, the switching system S1 seamlessly disconnects the communication segments A-S1 and C-S1 from each other and connects the communication segments B-S1 and C-S1, and then releases the communication segment A-S1, thus, completing the transfer. The transferred in-progress communication is illustrated in FIG. 6C, with the terminals B and C connected.

The described arrangement, according to certain embodiments, advantageously provides a capability to seamlessly transfer an in-progress call without interruption (e.g., in case of a low battery condition of a mobile device, or when the user has to leave the premise and switch to cellular phone, etc.). In this manner, the user can better manage communication services to obtain cost savings—for instance, the user can conserve wireless minutes by transferring to a landline.

The processes described herein for transferring in-progress communication between terminals may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
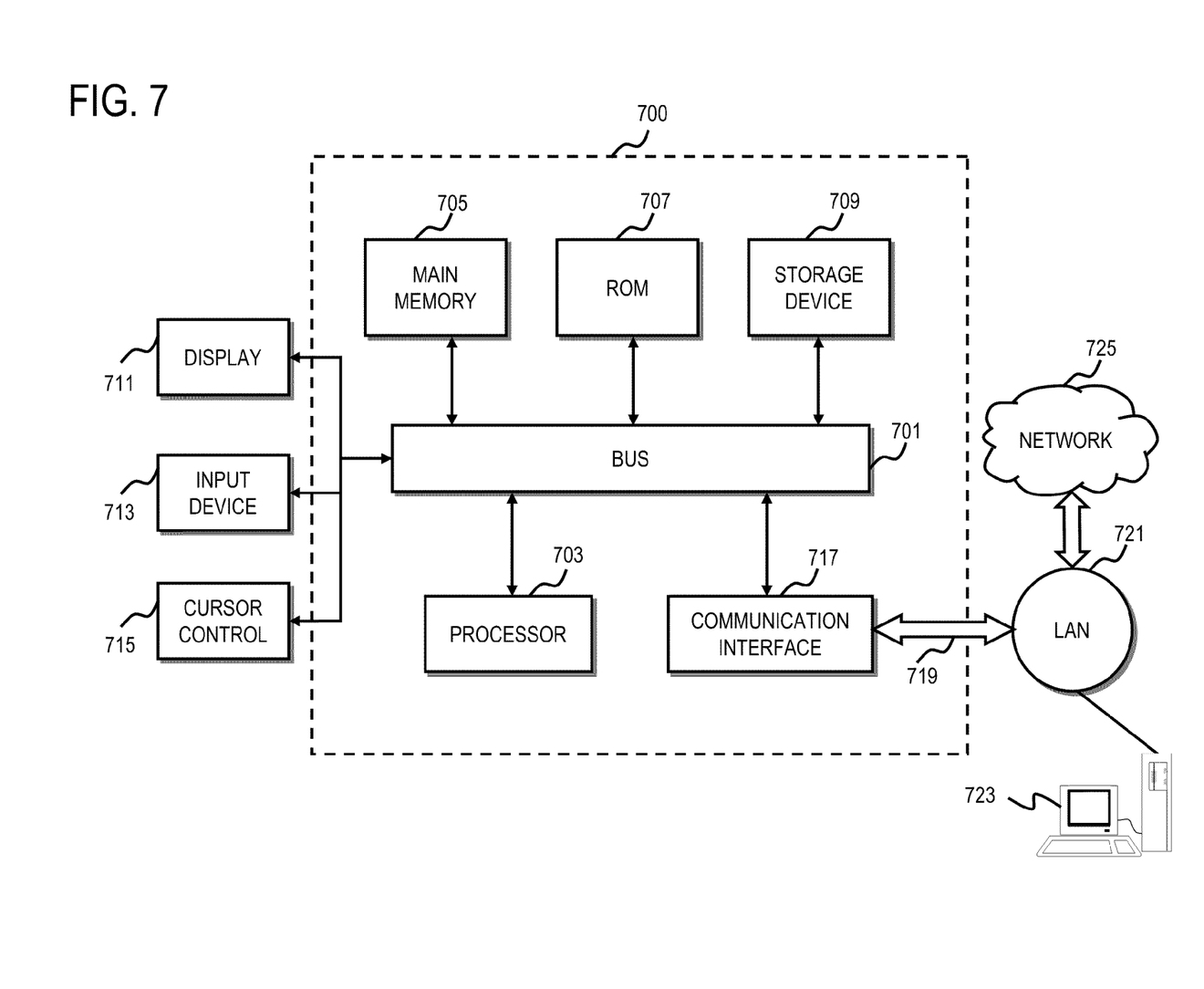
FIG. 7 is a diagram of a computer system that can be used to implement various exemplary embodiments.

FIG. 7 illustrates computing hardware (e.g., computer system) upon which an embodiment according to the invention can be implemented. The computer system 700 includes a bus 701 or other communication mechanism for communicating information and a processor 703 coupled to the bus 701 for processing information. The computer system 700 also includes main memory 705, such as random access memory (RAM) or other dynamic storage device, coupled to the bus 701 for storing information and instructions to be executed by the processor 703. Main memory 705 also can be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:

receiving, at a switching system, a transfer code from a target terminal of a user;

detecting an in-progress call between a first terminal and a second terminal, wherein the first terminal is associated with the user, and the second terminal is associated with another user; and initiating transfer of the in-progress call from the first terminal to the target terminal in response to the received transfer code, wherein the transfer code identifies the first terminal from which the in-progress call is to be transferred and is received as a transfer request transmitted from the target terminal, and the transfer request specifies the initiation of the transfer, and wherein the user of the first terminal and the user of the target terminal are the same.

2. A method of claim 1, further comprising:

determining whether the transfer code is valid, wherein the transfer is initiated if the transfer code is valid.

3. A method of claim 2, further comprising:

retrieving permission data that specifies one or more terminals, including the target terminal, that are permitted to transfer calls, wherein the determination of whether the transfer code is valid is based on the permission data.

4. A method of claim 3, wherein the permission data is provided by the user via at least one of a web interface and a telephony interface.

5. A method of claim 1, further comprising:

establishing a call segment to the target terminal;

disconnecting a call segment of the first terminal from a call segment of the second terminal;

connecting the call segment of the target terminal to the call segment of the second terminal; and releasing the call segment of the first terminal.

6. A method of claim 1, wherein the transfer code is received from another switching system configured to serve the target terminal.

7. A method of claim 6, wherein the first terminal is configured to operate with a wireline network coupled to the switching system; and the target terminal is configured to operate with a wireless network coupled to the other switching system.

8. A method of claim 6, wherein the first terminal is configured to operate with a wireless network coupled to the switching system, and the target terminal is configured to operate with a wireline network coupled to the other switching system.

9. A switching system comprising:

a first terminal; a second terminal; a target terminal; and logic configured to receive a transfer code from the target terminal of a user, to detect an in-progress call between the first terminal and the second terminal, wherein the first terminal is associated with the user, and the second terminal is associated with another user, wherein the logic is further configured to execute transfer of the in-progress call from the first terminal to the target terminal in response to the received transfer code, and wherein the transfer code identifies the first terminal from which the in-progress call is to be transferred and is received as a transfer request transmitted from the target terminal, and the transfer request specifies the initiation of the transfer, and wherein the user of the first terminal and the user of the target terminal are the same.

10. A switching system of claim 9, wherein the logic is further configured to determine whether the transfer code is valid, wherein the transfer is initiated if the transfer code is valid.

11. A switching system of claim 10, wherein the logic is further configured to retrieve permission data and to specify one or more terminals, including the target terminal, that are permitted to transfer calls, wherein the determination of whether the transfer code is valid is based on the permission data.

12. A switching system of claim 11, wherein the permission data is provided by the user via at least one of a web interface and a telephony interface.

13. A switching system of claim 9, wherein the logic is further configured to establish a call segment to the target terminal, to disconnect a call segment of the first terminal from a call segment of the second terminal, to connect the call segment of the target terminal to the call segment of the second terminal, and to release the call segment of the first terminal.

14. A switching system of claim 9, wherein the transfer code is received from another switching system configured to serve the target terminal.

15. A switching system of claim 14, wherein the first terminal is configured to operate with a wireline network coupled to the switching system, and the target terminal is configured to operate with a wireless network coupled to the other switching system.

16. A switching system of claim 14, wherein the first terminal is configured to operate with a wireless network coupled to the switching system, and the target terminal is configured to operate with a wireline network coupled to the other switching system.

17. An apparatus comprising:

a memory configured to store a transfer code corresponding to a target terminal of a user from a source terminal of the user, wherein the transfer code permits initiation of an in-progress communication transfer of a voice call between the source terminal and another terminal to the target terminal based on a receipt of the transfer code from the target terminal; and a processor configured to initiate transmission of the transfer code to a switch configured to process the voice call, wherein the transfer code identifies the first terminal from which the in-progress call is to be transferred and is received as a transfer request transmitted from the target terminal, and the transfer request specifies the initiation of the transfer, and wherein the user of the source terminal and the user of the target terminal are the same.

18. An apparatus of claim 17, further comprising:

a communication interface configured to transmit the transfer code to the switch in response to the switch receiving the transfer code from the target terminal.

19. An apparatus of claim 17, wherein the process is further configured to initiate retrieval of the transfer code from a database configured to store a user profile that includes the transfer code and information about the target terminal.

* * * * *